(Model.)

J. H. BARLEY.
Harrow.

No. 236,139.　　　　　　Patented Jan. 4, 1881.

Witnesses
Wm. W. Moorhmer
A. C. Kirkadden

Inventor
Jas. H. Barley
per
F. A. Lehmann,
Atty

N. PETERS, PHOTO-LITHOGRAPHER, WASHINGTON, D.C.

UNITED STATES PATENT OFFICE.

JAMES H. BARLEY, OF SEDALIA, MISSOURI.

HARROW.

SPECIFICATION forming part of Letters Patent No. 236,139, dated January 4, 1881.

Application filed October 28, 1880. (Model.)

To all whom it may concern:

Be it known that I, JAMES H. BARLEY, of Sedalia, in the county of Pettis and State of Missouri, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists in a double reversible tooth, which is placed upon a suitable pivot upon the side of the harrow-beam, whereby either one of the prongs can be brought into use at the will of the operator, as will be more fully described hereinafter.

The object of my invention is to make a tooth out of a single continuous piece of steel, and which is so constructed that it will turn upon its pivot in such a manner as to automatically bring either one of its points into operation, according as it is desired to have a vertical or a horizontal tooth.

Figure 1:
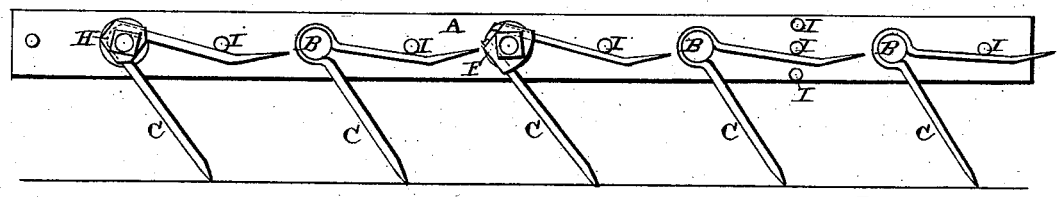
Figure 1:
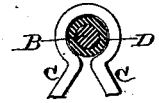
Figure 2:
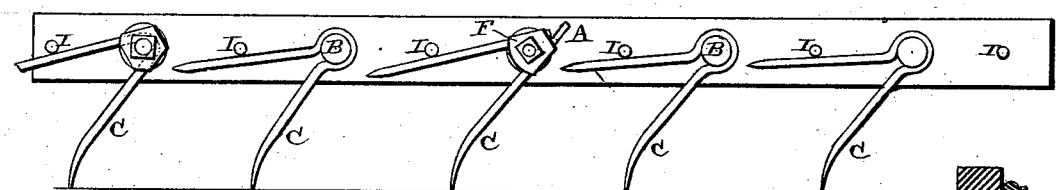
Figure 3:
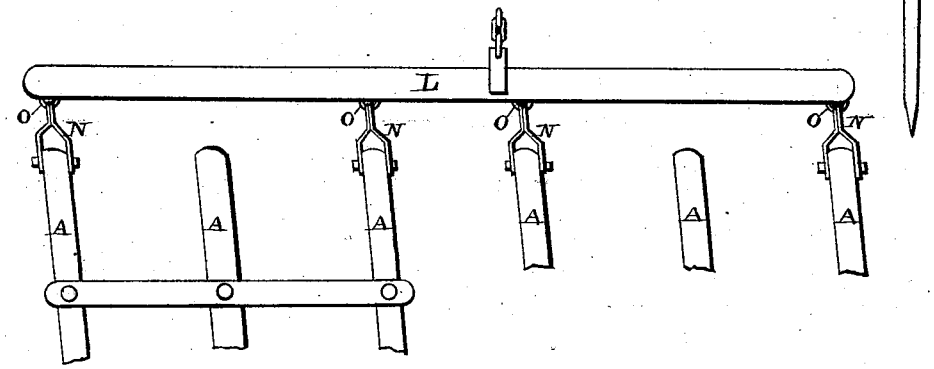

Figure 1 is a side elevation of my invention, showing the teeth in one position. Fig. 2 is a similar view, showing the teeth in the other position. Fig. 3 is a detail view, showing the clevis and its attachment.

A represents the harrow-beam, which may be made either of wood or iron, and of any construction that may be preferred. Pivoted upon the side of each beam of the harrow by means of suitably-headed bolts B, which pass horizontally through the beams, are the reversible spring-teeth C. Passed over the bolts and in between the head of the bolt and the side of the beam is a sleeve or thimble, D, and in between the outer end of the thimble or sleeve and the inner side of the head of the bolt is a washer for the purpose of preventing the tooth from slipping off over the head of the bolt. The tooth turns then upon the sleeve or thimble without coming in contact with the bolt itself, and then, it matters not how tightly the bolt may be drawn into position, the harrow-tooth will not be affected by it. Each one of the teeth is preferably made out of a continuous rod of steel having an eye at its center where it passes around the bolt, and having both of its ends sharpened, so as to fit it for work. One of the prongs of this double tooth is made perfectly straight, while the other one is bent, as shown, so that when brought into position for work it will stand vertically, or nearly so, to the harrow-beam.

Should it be preferred to form the teeth out of two separate and distinct pieces, instead of a single one, a plate, F, will be used having two diagonal grooves made through its under side, and then the clamping-bolt will be passed through the plate in between the two upper ends of the teeth while thus held by the plate. Against the side of the beam and over the bolt is passed a washer, against which the teeth are clamped by the plate, and which washer is made to turn with the teeth as they are changed from one position to the other. The only difference between the teeth formed out of two separate pieces and those formed out of a single piece is, that the teeth formed from a single piece will be much more elastic and springy than those formed from two separate pieces.

Where it is desired to form the tooth in one continuous piece, but without forming the eye at its center, the tooth may be bent into a V shape, and then a triangular-shaped flanged washer, H, placed over its bent portion, as shown. This washer will be clamped tightly against the washer which bears against the side of the beam, and the flanged washer, together with the tooth, will turn as freely around the pivotal clamping-bolt as though the eye had been formed in the tooth as above described.

The straight prong of each tooth forms an inclined tooth when the harrow is drawn forward; but when the harrow is drawn in the opposite direction from the opposite end the movement of the harrow causes the straight prong to be pushed backward and upward until the bent prong is brought into play, when a vertical tooth or prong is formed. This change from an inclined to a vertical tooth is made by simply reversing the motion of the harrow.

In between the pivotal bolts upon which the teeth turn are placed the stops I, against which the teeth strike. This stop may consist either of a single point or projection or any number of them, according as it may be desired to adjust each tooth into one or more positions for the purpose of obtaining a greater or a less slant, or making the bent prong stand more or less vertically to the harrow-beam.

The bent prong of each tooth is bent near the outer end only, so that there will be about the same slant in the tooth just below the under side of the beam that there is in the inclined tooth, for the purpose of moving the trash and dirt which it may catch downward, and then from the point where the tooth is bent the tooth stands more or less vertically to the under side of the beam, as may be desired.

Each harrow-beam is connected to the draft rod or bar L by means of a clevis, N, and an eyebolt, O. The clevis is attached to each side of the front end of the beam, and the front end of the flat clevis has passed through a hole in its front end the eyebolt, which is fastened or driven into the draft-bar. By thus having the two joints, which are here shown, each one of the sections is given a free vertical play, which adapts it for work upon both level and hilly ground. The harrow-beams are connected together by pieces which extend across their top, and which cross-pieces hold the beam rigidly in position, and owing to the peculiar construction of the coupling these beams or sections of the harrow have no side play whatever, while they have a very free vertical movement.

I am aware that it is not broadly new to secure the harrow-beams to the draft-rod by means of clevises and eyebolts where the beams can swing freely from side to side, and this I disclaim.

My invention consists in flattening together the two sides of the clevis, so as to make practically a solid piece, and then passing the eyebolt horizontally through the front end of the clevis, in contradistinction to simply hooking the two parts together. Where the clevis stands vertically, as is here shown, and the eyebolt horizontally, the beams have no sidewise play whatever, and hence the sections will never close upon each other as the harrow is drawn along.

Having thus described my invention, I claim—

1. The combination of a harrow-beam and a double harrow-tooth pivoted thereto, the tooth being adapted to turn upon the bolt, so that either prong may be brought into use, substantially as shown.

2. The combination of the harrow-beam and a double-pronged harrow-tooth pivoted thereto, one of the prongs being straight, while the other one is bent, so that when brought into use it will stand vertically, or nearly so, to the side of the harrow-beam, substantially as set forth.

3. A double-pronged harrow-tooth adapted to turn upon a pivotal bolt, in combination with the beam A, provided with suitable stops to hold the prongs in position, substantially as set forth.

In testimony that I claim the foregoing I have hereunto set my hand this 26th day of October, 1880.

J. H. BARLEY.

Witnesses:
F. A. LEHMANN,
C. S. DRURY.